Patented Aug. 11, 1953

2,648,665

UNITED STATES PATENT OFFICE 2,648,665

4 - QUINAZOLONE - 3 - ACETOACETIC ACIDS, THE ESTERS THEREOF AND SALTS OF SAID ACIDS AND SAID ESTERS

Bernard R. Baker, Nanuet, N. Y., and Merle V. Querry, Westwood, N. J., assignors to American Cyanamid Company, New York, N. Y., a corporation of Maine No Drawing. Application January 29, 1951, Serial No. 208,431

16 Claims. (Cl. 260—251)

This invention relates to 4-quinazolone-3-acetoacetic acids, the esters, and salts thereof, and methods of preparing the same.

The new class of compounds of this invention, when in the form of their free organic bases, may be represented by the following formula:

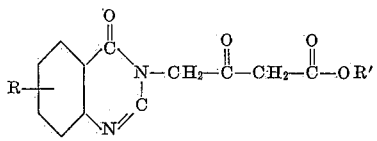

in which R is hydrogen or at least one substituent on the quinazolone nucleus and R' is a cation or an esterifying radical.

The substituent or substituents represented by R in the above formula may vary within wide limits and may be on one or more of the two, five, six, seven or eight positions of the quinazolone nucleus. Substituents of the following types are of value: halogen, for instance, Cl, Br, and Fl; alkoxy and aryloxy, for instance, —OCH₂, —OC₂H₅, —OCH₂C₆H₅; hydroxyl radicals; lower alkyl radicals, for instance, methyl, ethyl, propyl and butyl; aryl radicals, for instance, phenyl and substituted phenyl radicals; acyl radicals, for instance, —COR in which R is hydrogen or lower alkyl; acyloxy radicals, for instance, —OCOR in which R may represent H or lower alkyl; carboxyl radicals (—COOH) and the esters, amides and salts thereof.

The member represented by R' is a cation, for instance hydrogen or a salt forming metal, or an esterifying radical joined to oxygen by a carbon to oxygen linkage. Esterifying radicals which may suitably be represented by R' are illustrated by the following: alkyl, for instance, methyl, ethyl, propyl, and butyl; aromatic, for instance, phenyl and tolyl; alicyclic, for instance, cyclohexyl; aralkyl, for instance, benzyl. It is believed that one skilled in the art will have little difficulty selecting other suitable radicals.

There is evidence to indicate that the new compounds of this invention are tautomeric substances and may sometimes exist, at least partially, in one or more enolic forms. Such tautomerism may be illustrated by the following equation:

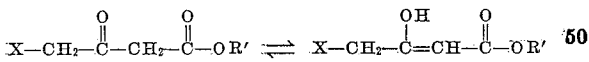

in which X represents a quinazolone nucleus and R' is as defined above. As is well understood by those skilled in the art, such tautomerism is due to a shifting proton and the keto and enol are not two different compounds but are two different forms of the same compound. The existence of a shifting proton in a compound can not be clearly shown by a single formula and therefore, in this specification and claims, the general practice has been followed and the keto type of structural formula is employed to represent the new compounds regardless of the fact that they may exist in part in enol form.

Typical of nitrogen bases, the new quinazolone compounds of this invention form salts with acids. For instance, the new compounds may be isolated as the hydrochloride and this salt used in place of the free base in subsequent reactions. Typical of many tautomeric substances, the new compounds also form metal salts, for instance with the alkali metals, the alkaline earth metals or even with less reactive metals. In fact, the copper salts of the new compounds are quite valuable and offer an excellent means of isolation and purification.

The new compounds of this invention are useful in organic synthesis, for instance as dye intermediates or as intermediates in the preparation of pharmaceuticals. For example, the new compounds may readily be employed in the manufacture of certain compounds having anti-malarial activity. It is intended, however, that this invention cover the new compounds per se and it is not to be construed as being limited to any particular field of utility.

While it is not intended that this invention be limited to quinazolone compounds made by any specific process, a particularly convenient method of preparing the new compounds has been discovered and this new method also constitutes a part of this invention. The new method comprises reacting a 4-quinazolone-3-acetyl malonic acid ester with water under such conditions that one —COOR group is replaced by hydrogen. The reaction may be illustrated by the following equation:

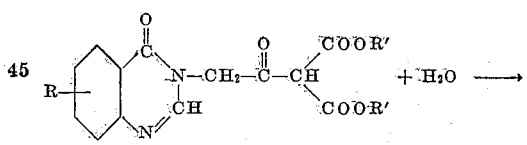

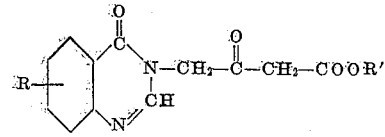

in which R and R' are as defined above.

The reaction is accomplished by heating the 4-quinazolone-3-acetyl malonic acid ester in the presence of moisture at temperatures of about 50° C. to about 125° C., and preferably in the range of 80° C. to 120° C. While the moisture may be present as steam, the reaction can be more satisfactorily performed in aqueous solution. Of course, by aqueous solution it is meant that some water is present in the reaction mixture and various amounts of water miscible inert organic solvents, for instance dioxane, may also be present to increase the solubility of the quinazolone compound.

The reaction proceeds immediately at temperatures above 50° C. and in most instances is substantially complete in about 48 hours at 50° C. and in about 20 minutes to 3 hours at 100° C. An approximate complete reaction time for other selected reaction temperatures can be obtained by extrapolation.

The invention will be more fully illustrated by the following specific examples in which all parts are by weight unless otherwise indicated.

Example I

A mixture of 3.7 parts by weight of sodium methoxide, 100 parts by volume of absolute alcohol, 10 parts by weight of 4-quinazolone and 7.2 parts by volume of ethyl chloroacetate is refluxed two hours, diluted with water, concentrated in vacuo, and again diluted with water. The oil is extracted with chloroform, the extracts evaporated and the residue crystallized from heptane to give about 12 parts by weight of white crystals of ethyl 4-quinazolone-3-acetate, having a melting point of about 76–77° C.

A solution of 21.5 parts by weight of ethyl 4-quinazolone-3-acetate in 107 parts by volume of 6N hydrochloric acid is refluxed two hours, cooled and brought to pH 4 with 28% ammonia water to obtain white crystals of 4-quinazolone-3-acetic acid having a melting point of about 228–230° C. with decomposition.

A mixture of 7 parts by weight of 4-quinazolone-3-acetic acid, 35 parts by volume of reagent ether (containing 0.5% pyridine) and 35 parts by volume of thionyl chloride is allowed to react for thirty minutes. The acid dissolves and white crystals of 4-quinazolone-3-acetyl chloride hydrochloride separate.

To 210 parts by volume of 1.5N magnesio malonic ethyl ester in benzene there is added 8.3 parts by weight of 4-quinazolone-3-acetyl chloride hydrochloride. The mixture is refluxed five minutes, then poured into ice and excess aqueous ammonium chloride. The separated benzene layer, washed with dilute acid, is evaporated and excess ethyl malonate distilled out at 1 mm. The residue is an oil of ethyl 4-quinazolone-3-acetyl) malonate. This compound is characterized as the copper derivative which forms blue-green crystals, insoluble in common solvents, and having a melting point of about 224° C. with decomposition.

A mixture of 1 part by weight of ethyl (4-quinazolone-3-acetyl) malonate and 10 parts by volume of water is refluxed for forty minutes. On cooling the solution deposits white crystals of ethyl (4-quinazolone-3-acetyl) acetate which melt at about 123–125° C. after recrystallization from dilute alcohol. This compound is soluble in acetone, hot alcohol or hot benzene, but insoluble in water or petroleum ether, and gives a red ferric chloride test.

The ester may be converted to the free acid or salts thereof by hydrolysis in the customary manner.

Example II

A mixture of 4.4 parts by weight of ethyl (4-quinazolone-3-acetyl) acetate, 22 parts by volume of toluene, 1.8 parts by volume of benzyl alcohol and 50 parts by weight of sodium methoxide is slowly distilled for one hour, acidified with 0.2 parts by volume of acetic acid and shaken with water. A solid separates at the interphase on standing. Recrystallization from methanol gives white crystals of benzyl (4-quinazolone-3-acetyl) acetate having a melting point of about 125–127° C. This compound is soluble in hot methanol, hot ethanol or hot toluene, but is insoluble cold in water, toluene, methanol or ethanol, and gives a red ferric chloride test.

Example III

A solution of 23.6 parts by weight of 4-chloro-7-methoxy-isatin (Helv., chim. acta, 2, 239) in 200 parts by volume of 5% sodium hydroxide is treated with 30 parts by volume of 30% hydrogen peroxide over a period of ten minutes. After ten minutes more the solution is clarified with activated carbon (Norit) and neutralized with hydrochloric acid. The 3-methoxy-6-chloroanthranilic acid precipitates and after recrystallization from aqueous methanol, has a melting point of about 145–146° C.

A mixture of twelve parts by weight of 3-methoxy-6-chloroanthranilic acid in five parts by volume of formamide is heated at about 130–135° C. for forty-five minutes and at 175° C. for seventy-five minutes. Addition of 8.5 parts by volume of 2-methoxyethanol and 85 parts by volume of water gives 5-chloro-8-methoxy-4-quinazolone which forms, on recrystallization from 2-methoxyethanol, white crystals having a melting point of about 311–313° C. with decomposition.

Example I is repeated except there is employed 14.5 parts by weight of 5-chloro-8-methoxy-4-quinazolone in place of the 4-quinazolone of that example. Ethyl(5-chloro-8-methyl-4-quinazolone-3-acetyl) acetate is obtained in approximately equal yield.

Example IV

In place of the 4-quinazolone of Example I there is employed 11 parts by weight of 5-methyl-4-quinazolone (Ber., 52, 1084). Ethyl(5-methyl-4-quinazolone-3-acetyl) acetate is obtained in approximately equal yield.

Example V

Fusion of 16 parts by weight of 6-chloroanthranilic acid (Monats. 22, 483) with 14 parts by volume of formamide according to the procedure of Example III gives approximately 13 parts by weight of tan crystals of 5-chloro-4-quinazolone having a melting point of about 210° C. after recrystallization from aqueous 2-methoxyethanol.

By employing 12.5 parts by weight of 5-chloro-4-quinazolone in place of the 4-quinazolone of Example I, there is obtained ethyl(5-chloro-4-quinazolone-3-acetyl) acetate in approximately equal yield.

Example VI

Ethyl(6-methyl-4-quinazolone-3-acetyl) acetate is prepared by the procedure of Example I, using 11 parts by weight of 6-methyl-4-quinazolone (Ber., 34, 3776) in place of the 4-quinazolone of that example.

Example VII

To a stirred solution of 90 parts by volume of 44% dibenzyl malonate in toluene, 50 parts by volume of toluene and 12 parts by weight of magnesium methoxide there is added 12 parts by weight of 4-quinazolone-3-acetyl chloride hydrochloride (prepared by the procedure of Example I). The mixture is stirred for one hour, acidified with 24 parts by volume of acetic acid and washed with water. Evaporation of the organic layer in vacuo gives an oil which is dissolved in 100 parts by volume of ethyl acetate, shaken with 90 parts by volume of 10% cupric acetate for two minutes and diluted with 50 parts by volume of heptane. The copper derivative of benzyl (4-quinazolone-3-acetyl) malonate separates. This compound forms light green needles having a melting point of 210–211° C. with decomposition on recrystallization from a mixture of ethyl acetate, chloroform and heptane. The compound is soluble in chloroform, but insoluble in ethyl acetate or water.

A mixture of 9.7 parts by weight of crude copper derivative, chloroform and 48 parts by volume of 1N hydrochloric acid is shaken until the green color disappears from the chloroform layer. The latter is evaporated to dryness leaving benzyl (4-quinazolone-3-acetyl) malonate as an oil which gives a red ferric chloride test.

A mixture of 9.1 parts by weight of benzyl (4-quinazolone-3-acetyl) malonate, 30 parts by volume of dioxane and 60 parts by volume of water is refluxed for one hour, then diluted with just enough alcohol to dissolve the oil. On cooling, the solution deposits white crystals of benzyl (4-quinazolone-3-acetyl) acetate having a melting point of about 134–136° C.

A mixture of 435 parts by weight of sodium hydride and 60 parts by volume of t-butyl alcohol is refluxed until solution is complete, then 6 parts by weight of benzyl (4-quinazolone-3-acetyl) acetate is added. After being refluxed for twenty minutes, the mixture is evaporated to dryness in vacuo to obtain the sodio derivative.

Example VIII 5-methyl-4-quinazolone-3-acetyl chloride hydrochloride is prepared in the same way that 4-quinazolone-3-acetyl chloride hydrochloride is prepared in Example I but using 11 parts by weight of 5-methyl-4-quinazolone in place of the 4-quinazolone of that example. The 5-methyl-4-quinazolone-3-acetyl chloride hydrochloride is then converted to benzyl (5-methyl-4-quinazolone-3-acetyl) acetate by the same procedure employed to convert 4-quinazolone-3-acetyl chloride hydrochloride to benzyl (4-quinazolone-3-acetyl) acetate in Example VII.

Example IX 5-chloro-4-quinazolone-3-acetyl chloride hydrochloride is prepared in the same way that 4-quinazolone-3-acetyl chloride hydrochloride is prepared in Example I but using 12.5 parts by weight of 5-chloro-4-quinazolone (prepared by the procedure of Example V) in place of the 4-quinazolone of Example I. The 5-chloro-4-quinazolone-3-acetyl chloride hydrochloride is then converted to benzyl (5-chloro-4-quinazolone-3-acetyl) acetate by the same procedure employed to convert 4-quinazolone-3-acetyl chloride hydrochloride to benzyl (4-quinazolone-3-acetyl) acetate in Example VII.

We claim:

1. Compounds selected from the group consisting of the 4-quinazolone-3-acetoacetic acids, the esters thereof and salts of said acids and said esters.
2. The ethyl (4-quinazolone-3-acetyl) acetates.
3. Ethyl(5 - methyl - 4 - quinazolone-3-acetyl)-acetate.
4. Ethyl(5 - chloro - 4 - quinazolone-3-acetyl)-acetate.
5. Ethyl(6-methyl-4-quinazolone - 3 - acetyl)-acetate.
6. The benzyl (4-quinazolone-3-acetyl acetates.
7. Benzyl(5 - methyl-4-quinazolone-3-acetyl)-acetate.
8. Benzyl(5-chloro - 4 - quinazolone-3-acetyl)-acetate.
9. A method for preparing the 4-quinazolone-3-acetoacetic acids, the esters thereof and salts of said esters and said acids which comprises heating an aqueous solution of a 4-quinazolone-3-acetylmalonic acid ester at a temperature of from about 50° C. to 125° C.
10. A method for preparing the ethyl(4-quinazolone-3-acetyl)acetates which comprises heating an ethyl(4 - quinazolone-3-acetyl)malonate in aqueous solution at a temperature of from about 50° C. to 125° C.
11. A method for preparing ethyl(5-methyl-4-quinazolone - 3-acetyl)acetate which comprises heating ethyl(5-methyl-4-quinazolone-3-acetyl)-malonate in aqueous solution at a temperature of 80° C. to 120° C.
12. A method for preparing ethyl(5-chloro-4-quinazolone - 3-acetyl)acetate which comprises heating ethyl(5-chloro-4-quinazolone-5-acetyl)-malonate in aqueous solution at a temperature of 80° C. to 120° C.
13. A method for preparing ethyl(6-methyl-4-quinazolone - 3-acetyl)acetate which comprises heating ethyl(6-methyl-4-quinazolone-3-acetyl)-malonate in aqueous solution at a temperature of 80° C. to 120° C.
14. A method for preparing the benzyl(4-quinazolone-3-acetyl)acetates which comprises heating a benzyl(4-quinazolone-3-acetyl)malonate in aqueous solution at a temperature of from about 50° C. to 125° C.
15. A method for preparing benzyl(5-methyl-4-quinazolone - 3-acetyl)acetate which comprises heating benzyl(5 - methyl - 6 - quinazolone - 3-acetyl)malonate in aqueous solution at a temperature of 80° C. to 120° C.
16. A method for preparing benzyl(5-chloro-4-quinazolone - 3-acetyl)acetate which comprises heating benzyl(5-chloro-4-quinazolone-3-acetyl)-malonate in aqueous solution at a temperature of 80° C. to 120° C.

BERNARD R. BAKER.
M. V. QUERRY.

No references cited.